United States Patent
Chang et al.

(10) Patent No.: US 11,625,082 B2
(45) Date of Patent: Apr. 11, 2023

(54) COMPUTING SYSTEM WITH A COOLING FUNCTION UTILIZING FORMULA WITH ALGORITHM

(71) Applicant: Jabil Circuit (Shanghai) Co., Ltd., Shanghai (CN)

(72) Inventors: Yen-Cheng Chang, New Taipei (TW); Chin Liang, New Taipei (TW)

(73) Assignee: Jabil Circuit (Shanghai) Co., Ltd., Shanghai (CN)

( * ) Notice: Subject to any disclaimer, the term of this patent is extended or adjusted under 35 U.S.C. 154(b) by 113 days.

(21) Appl. No.: 17/239,786

(22) Filed: Apr. 26, 2021

(65) Prior Publication Data
US 2021/0333850 A1  Oct. 28, 2021

(30) Foreign Application Priority Data
Apr. 27, 2020 (CN) .......................... 202010343363.0

(51) Int. Cl.
*G06F 1/20* (2006.01)
*G05B 19/4155* (2006.01)

(52) U.S. Cl.
CPC .......... *G06F 1/206* (2013.01); *G05B 19/4155* (2013.01); *G05B 2219/49216* (2013.01)

(58) Field of Classification Search
CPC ....................................................... G06F 1/206
See application file for complete search history.

(56) References Cited

U.S. PATENT DOCUMENTS

| | | | |
|---|---|---|---|
| 10,776,286 B1* | 9/2020 | Kulchytskyy | G06F 8/65 |
| 2015/0050120 A1* | 2/2015 | DeCesaris | G06F 1/20 |
| | | | 415/30 |
| 2016/0274629 A1* | 9/2016 | Lovicott | G06F 1/206 |
| 2017/0347494 A1* | 11/2017 | Dhote | H05K 7/20836 |
| 2017/0350403 A1* | 12/2017 | Kelly | F04D 27/001 |
| 2018/0210724 A1* | 7/2018 | Su | G06F 8/654 |
| 2019/0012101 A1* | 1/2019 | Jenne | G06F 3/0647 |
| 2019/0317592 A1* | 10/2019 | Mugunda | G06F 1/3287 |
| 2019/0361692 A1* | 11/2019 | Lin | G06F 8/65 |
| 2020/0226912 A1* | 7/2020 | Wright | G08B 25/005 |
| 2020/0233659 A1* | 7/2020 | Kim | G06F 8/658 |

FOREIGN PATENT DOCUMENTS

CN 106125592 A 11/2016

* cited by examiner

*Primary Examiner* — Suresh Suryawanshi
(74) *Attorney, Agent, or Firm* — Young Basile Hanlon & MacFarlane, P.C.

(57) ABSTRACT

A computing system includes a target device to be cooled, a fan unit, a storage device storing a first portion and a second portion of firmware, and a baseboard management controller (BMC). In the firmware, only the first portion is related to heat-dissipation control. The BMC executes the firmware for monitoring the target device, generating a monitoring report for the target device, and controlling the rotational speed of the fan unit based on the monitoring report thus generated and on cooling parameters and cooling algorithms stored in the first portion of the firmware.

8 Claims, 1 Drawing Sheet

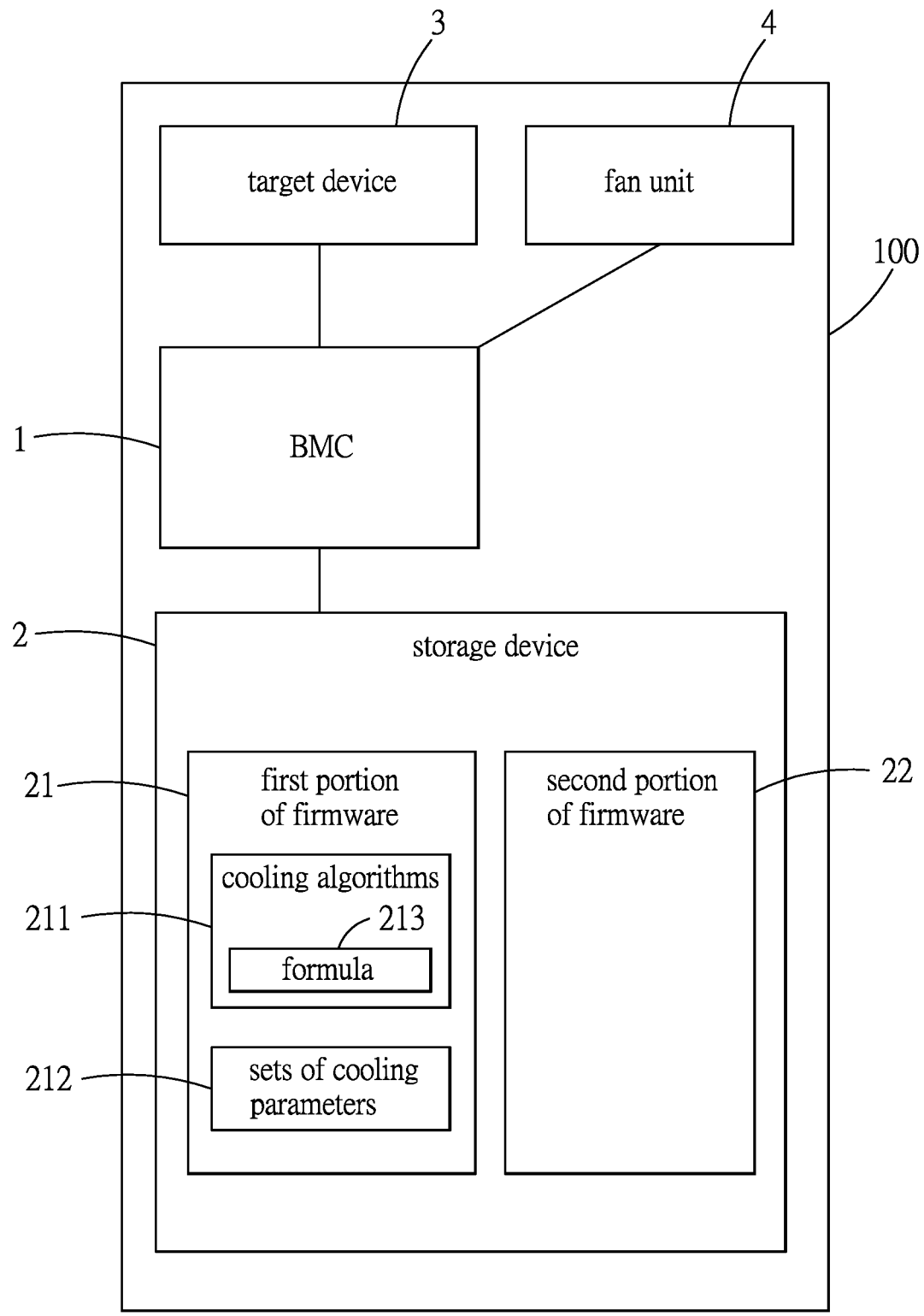

COMPUTING SYSTEM WITH A COOLING FUNCTION UTILIZING FORMULA WITH ALGORITHM

CROSS-REFERENCE TO RELATED APPLICATION

This application claims priority of Chinese Invention Patent Application No. 202010343363.0, filed on Apr. 27, 2020.

TECHNICAL FIELD

The disclosure relates to a computing system, and more particularly to a computing system that utilizes a fan unit to cool down components of the computing system.

BACKGROUND

A conventional computing system, such as a server, includes a baseboard management controller (BMC) that executes firmware to monitor hardware devices in the conventional computing system, including, for example, hard disk drives, expansion cards (e.g., Peripheral Component Interconnect Express (PCIe) cards), central processing units (CPUs). In particular, the BMC monitors temperatures of the hardware devices and maybe also temperatures at one or more spots of a chassis of the conventional computing system. The conventional computing system includes fans for cooling down the hardware devices and the chassis. The BMC may control rotational speeds of the fans based on the temperatures of the monitored components of the conventional computing system, in order to dissipate heat generated in the computing system well, so that these components may normally operate under moderate temperatures. The firmware is usually stored in flash memory accessible by the BMC, and can be updated by using remote connection or an external tool that is locally connected to the flash memory. However, such conventional update of the BMC firmware lacks time efficiency when only a portion of the firmware that is related to heat-dissipation control (e.g., a parameter table for controlling the rotational speeds of the fans) needs to be updated (which happens from time to time), because the firmware is updated as a whole.

SUMMARY

Therefore, an object of the disclosure is to provide a computing system that can alleviate at least one of the drawbacks of the prior art.

According to one aspect of the disclosure, the computer system includes at least one target device to be cooled, a fan unit, a storage device and a baseboard management controller (BMC) electrically connected to the at least one target device, the fan unit and the storage device. The fan unit includes at least one fan corresponding respectively to the at least one target device, wherein a rotational speed of each of the at least one fan is controlled for cooling the respective one of the at least one target device. The storage device stores a first portion of firmware and a second portion of the firmware. In the firmware, only the first portion is related to heat-dissipation control and includes multiple sets of cooling parameters and multiple cooling algorithms. The heat-dissipation control is related to the rotational speed of each of the at least one fan of said fan unit. The BMC is configured to access the first portion and the second portion of the firmware stored in the storage device, in order to execute the firmware for monitoring the at least one target device, generating at least one monitoring report respectively for the at least one target device being monitored, and controlling the rotational speed of each of the at least one fan of the fan unit based on the at least one monitoring report thus generated and on the sets of cooling parameters and the cooling algorithms stored in the first portion of the firmware.

BRIEF DESCRIPTION OF THE DRAWINGS

Other features and advantages of the disclosure will become apparent in the following detailed description of the embodiment(s) with reference to the accompanying drawings, of which:

FIG. 1 is a block diagram that exemplarily illustrates a computing system according to an embodiment of the disclosure.

DETAILED DESCRIPTION

FIG. 1 exemplarily illustrates a computing system 100 (which may be, for example, at least one server, but the disclosure is not limited thereto) according to an embodiment of the disclosure. The computing system 100 includes at least one target device 3 to be cooled (only one target device 3 is illustrated in FIG. 1 for simplicity), a fan unit 4, a storage device 2 and a baseboard management controller (BMC) 1 that is electrically connected to the at least one target device 3, the fan unit 4 and the storage device 2.

The at least one target device 3 relates to cooling operation. In some embodiments, the at least one target device 3 may include a device(s) included in the computing system 100 that generates or accumulates heat during operation. For example, the at least one target device 3 may include, for example, at least one central processing unit (CPU), at least one main memory device (e.g., random access memory (RAM)), at least one hard disk drive or at least one expansion card (e.g., Peripheral Component Interconnect Express (PCIe) card or graphics card), or any combination thereof. In some embodiments, the at least one target device 3 may include a chassis of the computer system 100. A temperature of air that enters the computer system (i.e., an ambient temperature) through the chassis may be detected for determining the cooling operation (e.g., operation of the fan unit 4). In an embodiment, the at least one target device 3 includes multiple target devices 3.

The fan unit 4 includes at least one fan corresponding respectively to the at least one target device 3 for cooling the at least one target device 3, wherein a rotational speed of each fan is controllable by the BMC 1. In an embodiment, the at least one target device 3 includes multiple target devices 3 and the at least one fan includes multiple fans corresponding respectively to the multiple target devices 3.

The storage device 2 may be, for example, flash memory. The storage device 2 stores a first portion 21 and a second portion 22 of firmware that is to be executed by the BMC 1. In the firmware, only the first portion 21 is related to heat-dissipation control that is related to the rotational speed of each fan of the fan unit 4, which means that the second portion 22 is irrelevant to heat-dissipation control. Multiple sets of cooling parameters 212 and multiple cooling algorithms 211 are included (i.e., stored) in the first portion 21 of the firmware.

The BMC 1 is configured to access the first portion 21 and the second portion 22 of the firmware stored in the storage device 2, in order to execute the firmware for monitoring the at least one target device 3, generating at least one monitoring report respectively for the at least one target device 3 being monitored, and controlling the rotational speed of each fan of the fan unit 4 based on the at least one monitoring report thus generated and on the cooling parameters 212 and the cooling algorithms 211 stored in the first portion 21 of the firmware.

Specifically, the monitoring of the at least one target device 3 is performed by the second portion 22 of the firmware executed by the BMC 1. According to some embodiments, the monitoring of the at least one target device 3 includes measuring the temperature of each target device 3. In an embodiment, the temperature of each target device 3 is measured by using at least one temperature sensor that is disposed in relation to the target device 3.

Then, the second portion 22 of the firmware executed by the BMC 1 generates the at least one monitoring report respectively for the at least one target device 3 based on a result of the monitoring. The at least one monitoring report each contains a (measured) temperature value of the target device 3 that the monitoring report is generated for (that the monitoring report corresponds to), and device information of said target device 3 that includes, for example, at least one of a brand of said target device 3, a product type of said target device 3, or a serial number of said target device 3.

After the at least one monitoring report is generated for the at least one target device 3, the second portion 22 of the firmware executed by the BMC 1 may select one monitoring report from among the at least one monitoring report thus generated, and send the temperature value included in the one monitoring report thus selected (i.e., the temperature value of the target device 3 corresponding to the one monitoring report (referred to as "focused target device" hereinafter)) and at least a portion of the device information included in the one monitoring report (i.e., at least a portion of the device information of the focused target device 3) to the first portion 21 of the firmware executed by the BMC 1. In an embodiment, the one monitoring report is selected by using a filtering criterion that is a temperature value threshold to filter the at least one monitoring report, in order to find out which of the at least one monitoring report contains a temperature value that is higher than the temperature value threshold (and thus corresponds to a target device 3 with a high temperature), and select the one monitoring report which corresponds to the focused target device 3 from among the monitoring report(s) thus found to correspond to the target device(s) 3 with a high temperature. In another embodiment, the one monitoring report is selected by using a filtering criterion that is a specified brand, a specified product type or a specified serial number, in order to find out which of the at least one monitoring report contains the specific brand, the specific product type or the specified serial number, and select the one monitoring report from among the monitoring report(s) thus found to correspond to target device(s) 3 of the specific brand, the specific product type or the specified serial number. For example, the second portion 22 of the firmware executed by the BMC 1 may select the one monitoring report using a filtering criterion that indicates a specific product type of a chassis, and send to the first portion 21 of the firmware executed by the BMC 1 information that indicates the chassis and that includes the temperature value corresponding to the selected monitoring report and serving as the ambient temperature value.

According to some embodiments, the at least a portion of the device information (referred to as "device description" hereinafter) that is sent to the first portion 21 of the firmware may include at least one of the brand of the focused target device 3, the product type of the focused target device 3, or the serial number of the focused target device 3. In response to receiving the temperature value and the device description of the focused target device 3, the first portion 21 of the firmware executed by the BMC 1 selects, based on the device description thus received, one set of cooling parameters from among the multiple sets of cooling parameters and one cooling algorithm from among the multiple cooling algorithms, determines a fan speed request (i.e., a required rotational speed of a fan) of one fan (referred to as "focused fan" hereinafter) among the at least one fan of the fan unit 4 that corresponds to the focused target device 3 based on the one set of cooling parameters and the one cooling algorithm, generates a control signal that corresponds to the fan speed request thus determined, and sends the control signal to the second portion 22 of the firmware executed by the BMC 1. In some embodiments, a corresponding relationship between the device description and the multiple sets of cooling parameters, and a corresponding relationship between the device description and the multiple cooling algorithms are predetermined. For example, the multiple sets of cooling parameters may include a first set of cooling parameters that corresponds to hard disk drives, and the multiple cooling algorithms may include a first cooling algorithm that corresponds to hard disk drives. When the first portion 21 of the firmware receives the device description that specifies a product type of "hard disk drive", the first set of cooling parameters and the first cooling algorithm may be selected. As another example, the multiple sets of cooling parameters may include the first set of cooling parameters that corresponds to hard disk drives of a first capacity, and a second set of cooling parameters that also corresponds to hard disk drives of a different, second capacity; and the multiple cooling algorithms may include the first cooling algorithm that corresponds to hard disk drives of the first capacity, and a second cooling algorithm that corresponds to hard disk drives of the second capacity. In this case, when the first portion 21 of the firmware receives the device description that specifies a product type of "hard disk drive" and a serial number that indicates the second capacity, the second set of cooling parameters and the second cooling algorithm may be selected.

The multiple cooling algorithms stored in the first portion 21 of the firmware each include at least one formula 213 and several operation steps. According to an embodiment, the operation steps of one of the cooling algorithms may include: (i) determining or confirming a number of the at least one target device 3 and maybe also installed position(s) of the at least one target device 3, in order to obtain device reference information; (ii) selecting, for each of the at least one target device 3, one of the at least one formula 213 included in the cooling algorithm and one of the multiple sets of cooling parameters that corresponds to the target device 3 based on at least one of the device description thus received or the device reference information thus determined (the selection of the one of the multiple sets of cooling parameters may be at least partially based on the selected one of the at least one formula 213); (iii) when the first portion 21 of the firmware receives the device description and the temperature value of the focused target device 3, determining the fan speed request of the focused fan corresponding to the focused target device 3 by applying the temperature value and one of the multiple sets of cooling parameters 212 that corresponds to the focused target device 3 to the formula 213 included in the cooling algorithm that corresponds to the focused target device 3.

According to some embodiments, the at least one formula 213 may include any of a formula that has an open-loop feature (e.g., the formula (1) described below), a formula that has a closed-loop feature (e.g., the formula (2) described below), and a formula that is related to exhaust temperature control (e.g., the formula (3) described below).

$$FSR = C_1T^2 + C_2T + C_3 \quad (1)$$

$$FSR = FSR_0 + K_Pe(t) + K_D\frac{e(t)-e(t_0)}{\Delta T} \quad (2)$$

$$FSR = \frac{1}{C_4}\left[\frac{1.76 \times \text{power}}{T_2 - T_1}\right] \quad (3)$$

In these formulas, FSR represents the fan speed request, and $FSR_0$ is a previously calculated FSR. $C_1$, $C_2$, $C_3$ of formula (1) and $C_4$ of formula (3) are thermal parameters, where $C_1$, $C_2$ and $C_3$ form a combination that is selected based on the focused target device 3. T represents the ambient temperature. Formula (2) describes a proportional-integral-derivative (PID) controller, where $K_P$ and $K_D$ are predetermined parameters. The function e(t) is related to a current temperature error that is a difference between the temperature value and a desired temperature value, and the function $e(t_0)$ is related to a previous temperature error that is a difference between a previous temperature value and the desired temperature value. $\Delta T$ is equal to $t-t_0$. "power" represents a current power consumption of the entire system. $T_1$ represents a current ambient temperature, and $T_2$ represents a temperature that is measured immediately prior to the measurement of $T_1$. The abovementioned formulas are merely used to exemplarily explain one possible implementation of the embodiment, but this disclosure is not limited to such. Other embodiments may use different algorithms and formulas to achieve thermal control, and should be deemed covered by the present disclosure.

Upon receiving from the first portion 21 of the firmware the control signal generated for the focused fan, the second portion 22 of the firmware executed by the BMC 1 controls the rotational speed of the focused fan based on the control signal to match the fan speed request determined for the focused target device 3. In an embodiment, delivery of the control signal between the first portion 21 of the firmware and the second portion 22 of the firmware supports intelligent platform management interface (IPMI) original equipment manufacturer (OEM) commands.

In this way, rotational speed(s) of the at least one fan included in the fan unit 4 may be individually controlled, in order to achieve required temperature control in the computing system 100. In an embodiment, the temperature of a chassis of the computing system 100 is also monitored and controlled.

The first portion 21 of the firmware and the second portion 22 of the firmware that are stored in the storage device 2 are configured to be updated independently of each other. For example, in some embodiments, the first portion 21 of the firmware may include only both the cooling parameters 212 and the multiple cooling algorithms 211, and is not related to other operations of the computer system 100, while the second portion 22 of the firmware is related only to the other operations of the computer system 100, and does not include any of the cooling parameters 212 and the cooling algorithms 211 (i.e., irrelevant to heat-dissipation control), so the first portion 21 of the firmware can be updated alone while the operations of the computer system 100 remain unaffected. Further, the first portion 21 of the firmware stored in the storage device 2 is configured to be partially updated by updating either the multiple cooling algorithms or the multiple sets of cooling parameters, wherein updating the multiple cooling algorithms includes updating the formulas 213 included in the cooling algorithms. For example, when only the formulas 213 of the cooling algorithms need to be updated, the firmware may be updated by using remote connection or an external tool that is locally connected to the storage device 2 to only update (overwrite) file(s) in the first portion 21 that is/are related to the formulas 213, keeping other portions of the firmware untouched. The partial update feature of the firmware of the disclosure makes the firmware update more flexible and more time-efficient in comparison to conventional techniques because the firmware is not required to be updated in its entirety every time. When only the first portion 21 of the firmware is updated, verification is not required to be performed on the entire firmware, but only needs to be performed on the function that is related to the first portion 21 of the firmware (e.g., heat dissipation control).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A computing system, comprising:
at least one target device to be cooled;
a fan unit that includes at least one fan corresponding respectively to said at least one target device, a rotational speed of each of said at least one fan being controlled for cooling the respective one of said at least one target device;
a storage device storing a first portion of firmware and a second portion of the firmware, wherein, in the firmware, only the first portion is related to heat-dissipation control and includes multiple sets of cooling parameters and multiple cooling algorithms, the heat-dissipation control being related to the rotational speed of each of said at least one fan of said fan unit, each of the cooling algorithms including at least one formula; and
a baseboard management controller (BMC) electrically connected to said at least one target device, said fan unit and said storage device, and configured to access the first portion and the second portion of the firmware stored in said storage device, in order to execute the firmware for monitoring said at least one target device, generating at least one monitoring report respectively for said at least one target device being monitored, and controlling the rotational speed of each of said at least one fan of said fan unit based on the at least one monitoring report thus generated and on the sets of cooling parameters and the cooling algorithms stored in the first portion of the firmware, wherein each of the at least one monitoring report contains a temperature value of the respective one of said at least one target device, wherein the first portion of the firmware when executed by said BMC determines, for one target device among said at least one target device, a fan speed request of one fan among said at least one fan that corresponds to said one target device by applying the temperature value of said one target device acquired from the at least one monitoring report and one of the multiple sets of cooling parameters that corresponds to said one target device to one of the at least one formula of one of the multiple cooling algorithms that corresponds to said one target device.

2. The computing system of claim 1, wherein:
each of the at least one monitoring report contains device information of the respective one of said at least one target device;
the second portion of the firmware when executed by said BMC selects one monitoring report among the at least one monitoring report that is generated for said one target device, and sends the temperature value of said one target device and at least a portion of the device information of said one target device that is included in said one monitoring report to the first portion of the firmware being executed by said BMC;
the first portion of the firmware when executed by said BMC determines, based on the at least a portion of the device information of said one target device, the one of the multiple sets of cooling parameters and the one of the multiple cooling algorithms for said one target device so as to determine the fan speed request of said one fan corresponding to said one target device in response to receiving the at least a portion of the device information of said one target device and the temperature value of said one target device, generates a control signal that corresponds to the fan speed request thus determined, and sends the control signal to the second portion of the firmware being executed by said BMC; and the second portion of the firmware when executed by said BMC controls the rotational speed of said one fan based on the control signal in response to receiving the control signal.

3. The computing system of claim 2, wherein delivery of the control signal between the first portion of the firmware and the second portion of the firmware supports intelligent platform management interface (IPMI) original equipment manufacturer (OEM) commands.

4. The computing system of claim 2, wherein the first portion of the firmware and the second portion of the firmware that are stored in said storage device are configured to be updated independently of each other.

5. The computing system of claim 4, wherein the first portion of the firmware stored m said storage device is configured to be partially updated by updating the multiple cooling algorithms or by updating the multiple sets of cooling parameters.

6. The computing system of claim 5, wherein the first portion of the firmware stored in said storage device is configured to be partially updated by updating the at least one formula of each of the cooling algorithms.

7. The computing system of claim 2, wherein:
the device information contained in each of the at least one monitoring report includes at least one of a brand of the respective one of said at least one target device, a product type of the respective one of said at least one target device, or a serial number of the respective one of said at least one target device;
the at least a portion of the device information related to said one target device that the second portion of the firmware executed by said BMC sends to the first portion of the firmware executed by said BMC includes at least one of the at least one of the number of said one target device; and
the first portion of the firmware executed by said BMC is to determine the fan speed request of said one fan corresponding to said one target device by selecting the one of the multiple sets of cooling parameters and the one of the multiple cooling algorithms based on said at least a portion of the device information that is received from the second portion of the firmware executed by said BMC.

8. The computing system of claim 1, wherein said at least one target device includes multiple target devices, and said at least one fan of said fan unit includes multiple fans corresponding respectively to said multiple target devices.

* * * * *